Dec. 24, 1957  P. M. McPHERSON  2,817,150
THICKNESS GAUGES
Filed Oct. 2, 1956
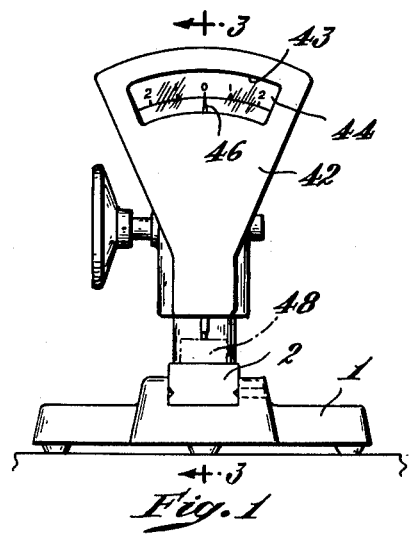
Fig. 1
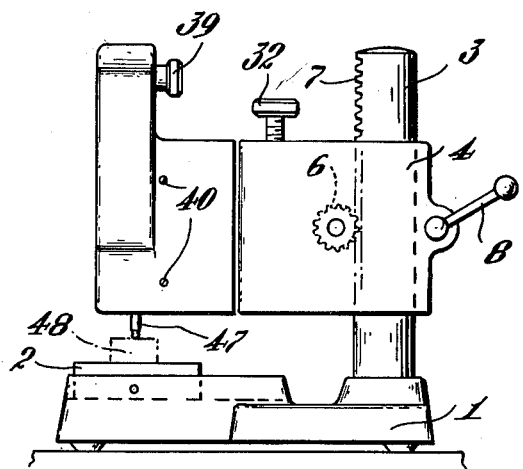
Fig. 2
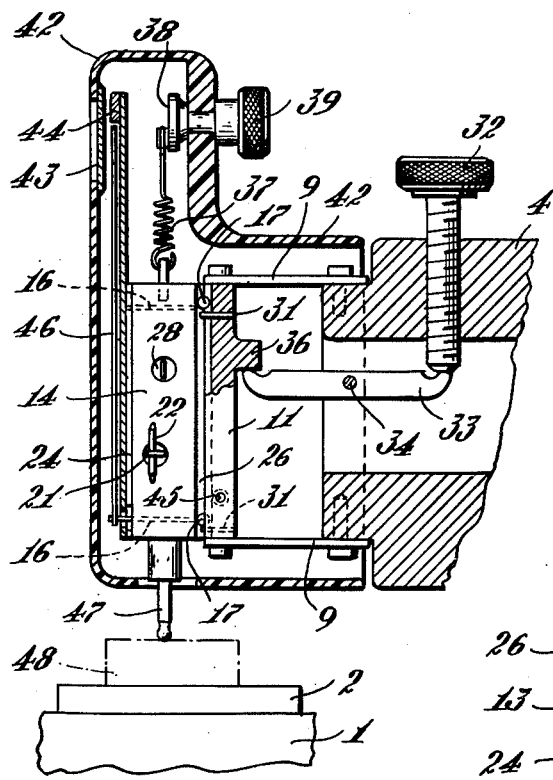
Fig. 3
Fig. 4
Fig. 5
Fig. 6
Inventor
Paul M. McPherson
by Roberts, Cushman & Grover
Attys

United States Patent Office 2,817,150
Patented Dec. 24, 1957

2,817,150

THICKNESS GAUGES

Paul M. McPherson, Acton, Mass.

Application October 2, 1956, Serial No. 613,557

3 Claims. (Cl. 33—147)

This invention relates to thickness gauges of the type having an anvil and a stylus to engage opposite sides of a standard gauge block and an object to be measured to compare their thicknesses.

Objects of the invention are to provide a gauge which is extremely sensitive and accurate, which will measure fragile and soft objects without danger of breakage or deformation, which is substantially frictionless and linear, which is free from lost motion, which is substantially vibrationless, and whose accuracy is not affected by the direction from which an object is inserted between stylus and anvil.

According to the present invention the gauge comprises a support having a gauge surface, a guide having a plane surface extending transversely of the gauge surface, a plunger having a plane surface parallel to the aforesaid plane surface, the plunger being movable lengthwise along a predetermined path transversely of the gauge surface, a stylus extending from the end of the plunger toward the gauge surface, between the plane surfaces two rollers spaced lengthwise of the plunger with their axes in planes perpendicular to the aforesaid path, a raceway extending lengthwise of the plunger adjacent one side of the space between the aforesaid plane surfaces, anti-friction means between the plunger and raceway, means for yieldingly urging the plunger against the rollers and anti-friction means while permitting free movement of the plunger along the aforesaid path, the movement being guided solely by the rollers and anti-friction means, one of one of the rollers projecting from the aforesaid space, and an indicator connected to the projecting end. Preferably the plane surfaces have opposed openings and a tension spring interconnects the guide and plunger through these openings, the spring being biased yieldingly to urge the plunger against both the rollers and anti-friction means while permitting the aforesaid free movement of the plunger. In the preferred embodiment the gauge surface extends horizontally, the movement of the plunger is vertical and a spring is provided for counterbalancing the weight of the plunger.

For the purpose of illustration a typical embodiment of the invention is shown in the accompanying drawings in which:

Fig. 1 is a front elevation;
Fig. 2 is a side elevation;
Fig. 3 is a section on line 3—3 of Fig. 1;
Fig. 4 is a side elevation of the guide and plunger with parts in section;
Fig. 5 is a section on line 5—5 of Fig. 4; and
Fig. 6 is a section on line 6—6 of Fig. 4.

The particular embodiment of the invention chosen for the purpose of illustration comprises a base 1 upon which is mounted an anvil 2 and an upstanding post 3. Sliding vertically on the post is a support 4 actuated by a pinion 6 meshing with the rack 7 on the post, a lock 8 being provided to hold the support in adjusted position.

Mounted on the support 4 by means of springs 9 is the raceway 11 and fast to the raceway by means of screws 12 is the guide 13. Movable vertically along one side of the guide 13 is the plunger 14, these two parts having plane surfaces facing each other. Disposed between these surfaces are two rollers 16 having their axes disposed horizontally. Disposed between the raceway 11 and the back of the plunger 14 are ball bearings 17. As shown in Figs. 4 and 6, the guide and plunger are provided with opposed openings 18 and 19 and the two parts are interconnected by a tension spring 21 extending through these openings and hooking over pins 22 disposed in recesses in the outer sides of the guide and plunger, the spring being biased so as yieldingly to urge the plunger against both the rollers and balls while permitting free movement of the plunger up and down. Fastened to the front of the guide 13 by means of screws 23 is a thin strip 24 and fastened to the back of the guide by means of the aforesaid screws 12 is a similar strip 26. As shown in Figs. 4 to 6 these strips overlap the space between the guide 13 and plunger 14 and have notches 27 to receive the projecting ends of the rollers 16, the notches being wide enough to permit movement of the plunger throughout its full range without interfering with the free rolling of the rolelrs. Mounted in the guide 13 is a pin 28 which extends into an opening 29 in the plunger to limit the longitudinal movement of the plunger. Extending through the raceway 11 are pins 31 to hold the balls 17 in position during assembly and to prevent accidental displacement of the balls during use.

The raceway 11 and attached guide 13 are adjustable vertically by means of a screw 32 bearing on one end of a lever 33 which is pivoted at 34, the other end of the lever bearing on the underside of a lug 36 on the rear side of the raceway. The weight of the plunger 14 is counterbalanced by a spring 37, the tension of which may be adjusted by an eccentric 38 which is actuated by a knob 39 and held in adjusted position in any suitable manner. Surrounding the plunger and associated parts is a light casing 42 secured to the sides of the raceway 11 by means of screws 40 threading into openings 45 in the raceway. As shown in Figs. 3 and 5 this casing contacts only the raceway 11 and the eccentric adjusting device for the spring 37. In the upper portion of the front face of the casing 42 is a window 43 and behind the window is a scale 44 secured to the front of the guide 13 by the aforesaid screws 23 (Fig. 5). Fast to the forward end of the lower roller 16 is a pointer 46 which moves over the scale 44. Fast to the bottom of the plunger 14 is a stylus 47 for engagement with gauge blocks and objects to be measured as indicated in broken lines at 48 in Figs. 1, 2 and 3.

To compare the thickness of an object with a standard gauge block, the block is placed on the anvil, the support 4 is lowered by means of pinion 6 until the tip of the stylus is approximately at the level of the top surface of the gauge block and, with the stylus resting on the block, the screw 32 is adjusted until the pointer is at zero. When so adjusted the parts should occupy the relative positions shown in the drawings, with the rollers 16 centered in the notches 27 and the pin 28 centered on the opening 29 (Fig. 4). Then the block is replaced by the object to be measured and the pointer deviation from zero indicates the amount the object is over or under size. While the spring 37 should never be adjusted to carry the entire weight of the plunger, when measuring frangible or soft articles it should carry substantially all the weight. Inasmuch as the plunger bears on nothing but the rollers 16 and balls 17 the movement of the plunger is substantially frictionless and the gauge is extremely accurate.

It should be understood that the present disclosure is for the purpose of illustration only and that this invention includes all modifications and equivalents which fall within the scope of the appended claims.

I claim:

1. A thickness gauge comprising a support, on the support a gauge surface and a guide having a plane surface extending transversely of the gauge surface, a plunger having a plane surface parallel to said plane surface, the plunger being movable lengthwise along a predetermined path transversely of the gauge surface, a stylus extending from the end of the plunger toward the gauge surface, between said plane surfaces two rollers spaced lengthwise of the plunger with their axes in planes perpendicular to said path, a raceway extending lengthwise of the plunger adjacent one side of the space between said plane surfaces, anti-friction means between the plunger and raceway, means for yieldingly urging the plunger against said rollers and anti-friction means while permitting free movement of the plunger along said path, said movement being guided solely by said rollers and anti-friction means, one end of one of said rollers projecting from said space, and an indicator connected to the projecting end.

2. A thickness gauge comprising a support, on the support a gauge surface and a guide having a plane surface extending transversely of the gauge surface, a plunger having a plane surface parallel to said plane surface, the plunger being movable lengthwise along a predetermined path transversely of the gauge surface, a stylus extending from the end of the plunger toward the gauge surface, between said plane surfaces two rollers spaced lengthwise of the plunger with their axes in planes perpendicular to said path, a raceway extending lengthwise of the plunger adjacent one side of the space between said plane surfaces, anti-friction means between the plunger and raceway, said plane surfaces having opposed openings, a tension spring interconnecting said guide and plunger through said openings, the spring being biased yieldingly to urge the plunger against said rollers and anti-friction means while permitting free movement of the plunger along said path, said movement being guided solely by said rollers and anti-friction means, one end of one of said rollers projecting from said space, and an indicator connected to the projecting end.

3. A thickness gauge comprising a support, on the support a horizontal gauge surface and above the gauge surface a guide having a vertical plane surface, a plunger having a plane surface opposed to said plane surface, a stylus extending from the bottom of the plunger over the gauge surface, a spring for counter-balancing the weight of the plunger, between said plane surfaces two rollers spaced vertically with their axes horizontal, a raceway extending lengthwise of the plunger adjacent one side of the space between said plane surfaces, anti-friction means between the plunger and raceway, means for yieldingly urging the plunger against said rollers and anti-friction means while permitting free movement of the plunger along said path, said movement being guided solely by said rollers and anti-friction means, one end of said rollers projecting from said space, and an indicator connected to the projecting end.

No references cited.